United States Patent [19]

Saito

[11] 4,327,242
[45] Apr. 27, 1982

[54] METHOD FOR CONTROLLING GAS PRESSURE SEALED IN COAXIAL COMMUNICATION CABLE

[75] Inventor: Yasunori Saito, Yokohama, Japan
[73] Assignee: Sumitomo Electric Industries, Ltd., Osaka, Japan
[21] Appl. No.: 131,338
[22] Filed: Mar. 18, 1980

[30] Foreign Application Priority Data

Apr. 3, 1979 [JP] Japan ................................. 54-40629
Jul. 13, 1979 [JP] Japan ................................. 54-89681

[51] Int. Cl.³ ...................... H02G 1/00; H01B 11/18; H01P 3/06
[52] U.S. Cl. ................................ 174/11 R; 333/17 R
[58] Field of Search ........................... 174/11 R, 14 R; 333/17 R, 243, 244, 245

[56] References Cited

FOREIGN PATENT DOCUMENTS 44-17469 7/1969 Japan ................................. 174/11 R
46-24830 7/1971 Japan ................................. 174/11 R Primary Examiner—Laramie E. Askin
Attorney, Agent, or Firm—Sughrue, Mion, Zinn, Macpeak & Seas

[57] ABSTRACT

A method and apparatus for controlling the pressure of gas sealed in a coaxial communication cable so as to maintain the dielectric constant and hence electrical length thereof constant independent of temperature or the leakage of insulating gas sealed therein. Electrical signals are produced representing the temperatures of the gas sealed in the cable and the temperature of a reference gas sealed in a closed container as well as signals representing the pressures thereof. The two temperature signals are compared and the temperature of the reference gas adjusted in accordance therewith by a constant temperature bath. The two pressure signals are compared and gas is fed into the cable in accordance therewith. The temperatures of the cable and the reference gas are maintained at the same values as are the pressures thereby maintaining the density and hence dielectric constant of the gas sealed in the coaxial cable constant at all times.

6 Claims, 3 Drawing Figures

METHOD FOR CONTROLLING GAS PRESSURE SEALED IN COAXIAL COMMUNICATION CABLE

BACKGROUND OF THE INVENTION

The present invention relates to a method for controlling gas pressure filled in a coaxial communication cable in order to minimize variations in phase characteristics of the cable due to variations in ambient temperature.

Recently, observation systems have been employed in which a large antenna is formed by connecting with coaxial cables a number of antenna elements which are spaced apart from one another on the ground. Such observation systems have been employed in specific fields such as radio astronomy in order to intercept radio waves from space. In such systems, reception of signals is carried out for a long observation period such as over several months therefore making it a requirement that the electrical length of the system be constant. In order to meet this requirement, a technique for maintaining the entire system at a constant temperature or a technique for providing a phase control device to compensate for variations of the electrical length of the system due to variations of the ambient temperature in the system has been employed. However, such techniques are disadvantageous in that they are expensive to implement and it is difficult with these techniques to satisfactorily control the ambient temperature.

In order to overcome the above-described difficulty, a technique has been proposed in the art, in which the structure of a cable is modified to considerably reduce the dependence of the electrical length of the cable on temperature. This technique has been applied to cables in which the inner and outer conductors are spaced apart from each other so as to provide electrical insulation therebetween. It is essential that the insulation space between the conductors be constantly maintained in a dry state. For this purpose, dry gas is sealed in the insulation space. Moreover, the sealed gas pressure should be precisely controlled at a constant value and the gas tightness of the connecting terminals at both ends of the cable maintained because, if the sealed gas pressure varies, the electrical length of the cable will undesirably vary. Typically, the electrical length variation factor due to dry air sealing pressure variations is of the order of $10^{-4}$ kg/cm$^2$. Yet further, the sealed gas pressure is also affected by temperature variations. Therefore, in order to carry out the control operation satisfactorily, it is necessary to determine whether a pressure variation is caused by gas leakage or temperature variation.

The electrical length of the cable is affected by the sealed gas not because of the gas pressure directly but because of variations in the dielectric constant of the gas due to variations in density of the gas. If the sealed gas pressure were to be varied in accordance with temperature variations under the condition that no gas leaks from the cable, the electrical length variational factor of the cable would be quite low, of the order of $10^{-8}$/°C. for a gas pressure variational factor of 5–6 g/cm$^2$/°C. Thus, in order to maintain stable the electrical length of a cable, variations in density of the sealed gas should be minimized.

SUMMARY OF THE INVENTION

In accordance with the method of the invention, the pressure of dry gas sealed in the insulation space of a coaxial communication cable whose electrical length has been stabilized against temperature variation is appropriately controlled by following the variation of temperature in the cable with gas pressure variations determined in accordance with temperature variations. Accordingly, the electrical length of the cable can be highly stabilized without the above-described intricate operations such as temperature control and phase adjustment.

In accordance with the method of the invention, the temperatures of a cable and the reference container are converted into electrical signals by a pair of measuring sensors while the gas pressures of the cable and the reference container are also converted into electrical signals by a pair of measuring sensors, and the electrical signals produced by the sensors are applied to respective comparison circuits. Control is carried out in accordance with the results of the comparison operations. In this fashion, control is achieved with a very high accuracy. Furthermore, the control apparatus of the invention is simple in construction and is therefore economical.

More specifically, in accordance with the invention there is provided a method for controlling the pressure of a gas sealed in an electrically insulated space between inner and outer conductors of a coaxial communication cable including controlling the pressure of the gas sealed in the coaxial cable to vary in accordance with variations in the temperature, that is the internal temperature, of the coaxial cable by satisfying the equation:

$$P(T) = P(T_o) \cdot \left(1 + \frac{T - T_o}{273 + (T - T_o)}\right),$$

where $T_o$ is a predetermined reference temperature, $P(T)$ is the pressure of the gas, $T$ is the temperature of the coaxial cable, and $P(T_o)$ is the absolute pressure of the gas sealed in the coaxial cable at the reference temperature. Preferably, the pressure of the gas sealed in the coaxial cable is controlled so as to be equal to the pressure of a reference gas sealed in a closed container with the temperature of the reference gas being maintained equal to the temperature of the coaxial cable. The closed container may be disposed in a constant temperature bath. There may further be performed the steps of producing electrical signals representing the temperature of the coaxial cable and the temperature of the gas in the closed container, comparing the electrical signals representing the temperatures, controlling the temperature of the bath in response to the result of the step of comparing the signals representing these temperatures so as to maintain the temperature of the coaxial cable and the temperature of the gas in the closed container at the same values, producing electrical signals representing the pressure of the gas sealed in the closed container and the pressure of the gas sealed in the coaxial cable, comparing the signals representing the pressures, and controlling the pressure of the gas sealed in the coaxial cable in response to the result of the step of comparing the signals representing the pressures so that the pressures are maintained equal to each other. Preferably, the pressure of the gas sealed in the coaxial cable is controlled so as to be equal to the pressure of the gas sealed in the closed container.

DESCRIPTION OF THE PREFERRED EMBODIMENTS

Figure 1:
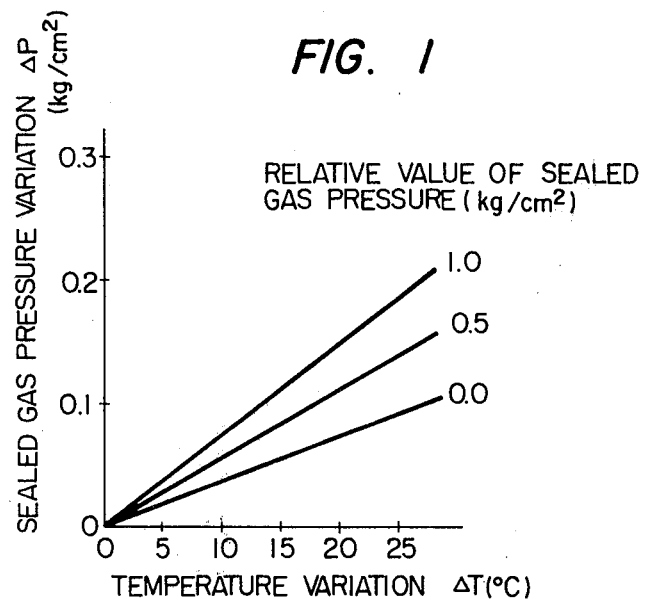
FIG. 1 is a graphical representation indicating the relation between temperature variation and sealed gas pressure variation.

First, the principle of phase (electrical length) stabilization according to the invention will be described.

The phase temperature coefficient $k_\beta$ of a gas-sealed type coaxial cable having a physical length l is the sum of the temperature coefficient of the phase constant of the cable, the temperature coefficient of the cable length and a gas pressure coefficient due to temperature change of the phase constant. This assumes that no sealed gas leakage occurs as is apparent from the following equation describing the phase temperature coefficient $k_\beta$.

$$k_\beta = \frac{1}{\beta l} \frac{\partial \beta l}{\partial T} = \frac{1}{\beta} \frac{\partial \beta}{\partial T} + \frac{1}{l} \frac{\partial l}{\partial T} + \frac{1}{\beta} \frac{\partial \beta}{\partial P} \frac{\Delta P}{\Delta T} \quad (1)$$

In general, the coefficient of thermal expansion of an insulator is larger than that of a conductor. The first term on the right side of Equation 1, the temperature coefficient of the phase constant for an insulator, is approximately equal to one-half the temperature coefficient of the effective dielectric constant of the material. In the case of an air dielectric coaxial cable, the first term can be evaluated by the following Equation:

$$\frac{1}{\beta} \frac{\partial \beta}{\partial T} \approx \frac{1}{2} \frac{1}{\epsilon} \frac{\partial \epsilon}{\partial T} \quad (2)$$

$$\approx \frac{\epsilon_m}{2} \times \frac{R}{1 + R(\epsilon_m - 1)} \left[ \frac{1}{\epsilon_m} \frac{\partial \epsilon_m}{\partial T} + \left(1 - \frac{1}{\epsilon_m}\right) \left\{ \alpha_m - \frac{d_1 \alpha_1 + d_2 \alpha_2}{d_1 + d_2} \right\} \right].$$

where R is the space factor of the insulator, $\epsilon_m$ is the inherent dielectric constant of the insulating material, $\alpha_m$ is the coefficient of linear expansion thereof, and $\alpha_1$ and $\alpha_2$ are the coefficients of linear expansion of the inner and outer conductors.

It is well known in the art that the second term on the right side of Equation 1 can be represented by the following Equation 3 in the case where the inner and outer conductors are rigidly secured to the insulator:

$$\frac{1}{l} \frac{\partial l}{\partial T} \approx \frac{S_1 E_1 \alpha_1 + S_2 E_2 \alpha_2}{S_1 E_1 + S_2 E_2}, \quad (3)$$

where $S_1$ and $S_2$ are the cross-sectional areas of the inner and outer conductors, respectively, $E_1$ and $E_2$ are the Young's moduli of the materials of the inner and outer conductors, respectively, and $\alpha_1$ and $\alpha_2$ are the coefficients of the linear expansion of the inner and outer conductors.

The third term on the right side of the Equation 1 represents the effects of sealed gas pressure variations due to temperature variation. In the case where the sealed gas pressure is about 1 kg/cm$^2$ and the variations in the length of the cable due to variations in the gas pressure can be disregarded, then the third term can be expressed by the space factor and the dielectric constant of the insulating material $\epsilon_m$, pressure coefficient, dielectric constant of the gas $\epsilon_o$, and gas pressure P of the sealed gas as follows:

$$\frac{1}{\beta} \frac{\partial \beta}{\partial P} \frac{\Delta P}{\Delta T} = \frac{1}{2} \frac{\epsilon_m R}{1 + (\epsilon_m - 1)R} \frac{P}{273} \left( \frac{1}{\epsilon_m} \frac{\partial \epsilon_m}{\partial P} + \left(\frac{1}{\epsilon_m}\right) \frac{1 - R}{R} \frac{1}{\epsilon_o} \frac{\partial \epsilon_o}{\partial P} \right). \quad (4)$$

Therefore, from Equations 1 through 4, the phase temperature coefficient of the gas-sealing coaxial cable of space insulation type is:

$$k_\beta = \frac{1}{2} \frac{\epsilon_m R}{1 + (\epsilon_m - 1)R} \left[ \frac{1}{\epsilon_m} \frac{d\epsilon_m}{dT} + \left(1 - \frac{1}{\epsilon_m}\right)\left(\alpha_m - \frac{d_1 \alpha_1 + d_2 \alpha_2}{d_1 + d_2}\right) + \frac{P}{273}\left\{\frac{1}{\epsilon_m}\frac{d\epsilon_m}{dP} + \left(\frac{1}{\epsilon_m}\right)\frac{1-R}{R}\frac{1}{\epsilon_o}\frac{d\epsilon_o}{dP}\right\}\right] + \frac{S_1 E_1 \alpha_1 + S_2 E_2 \alpha_2}{S_1 E_1 + S_2 E_2}. \quad (5)$$

From this equation, it may be seen that a phase stabilizated coaxial cable can be realized by selecting the space factor R of the insulator and the sealed gas pressure P so that the phase temperature coefficient $k_\beta$ given by Equation 5 becomes zero. However, since the dielectric constant $\epsilon_m$ of the insulating material and its temperature coefficient $$\frac{1}{\epsilon_m} \frac{\partial \epsilon_m}{\partial T}$$

are, in general, functions of temperature T, it is necessary to select the space factor R of the insulator and the gas pressure P under the assumption that these factors are constants at a given ambient temperature.

However, in the case where there is no leakage at all of the sealed gas, the variation in dielectric constant of the sealed gas can be disregarded even if the gas pressure is changed by temperature variations. That is, the second term in braces in the Equation 5 can be disregarded. In this connection, it should be noted that the variational factor of the gas pressure due to temperature variations is of the order of 4–10 g/cm$^2$/°C. even if the sealed gas pressure is selected to be 0.1–1 kg/cm$^2$ with respect to atmospheric pressure as is the customary usage. Accordingly, in the case where the temperature drops greatly, it is necessary to determine whether a gas pressure reduction is due to temperature variation or gas leakage. If gas pressure control is effected so that the pressure of gas in the cable is maintained unchanged irrespective of temperature variations, then the dielectric constant of the space between the conductors changes considerably with the result that the electrical length of the cable is correspondingly lowered. When dry air is employed as the sealed gas, the pressure coefficient of the dielectric constant is of the order of $6 \times 10^{-4}/kg/cm^2$ even if the temperature is maintained unchanged and, accordingly, the pressure coefficient for the electrical length is of the order of $10^{-4}/kg/cm^2$.

FIG. 1 is a graphical representation indicating sealed gas pressure variations $\Delta P$ with respect to temperature variations $\Delta T$ for the case of no sealed gas leakage. If the gas pressure at a selected reference temperature is represented by $P_o$, then:

$$P = \frac{P_o}{273} \times \Delta T.$$

Even where the gas pressure is equal to the atmospheric pressure, the gas pressure temperature coefficient is 3.8 g/cm²/°C.

Figure 2:
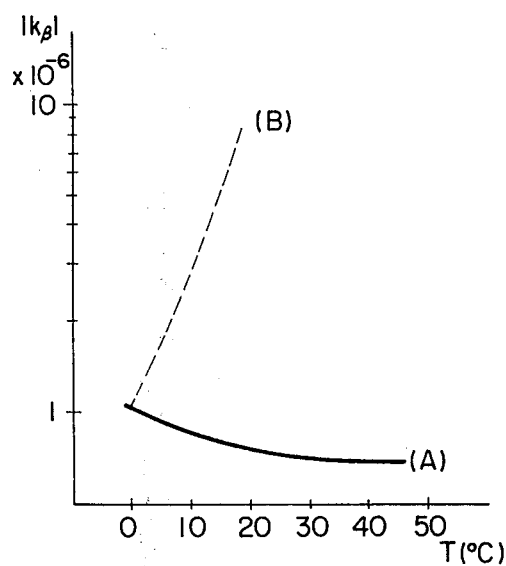
FIG. 2 is also a graphical representation indicating the relation between temperature and phase temperature coefficient.

FIG. 2 illustrates an example of the improvement in temperature-induced variations of the phase temperature coefficient brought about with the use of the present invention. The curve A in FIG. 2 represents the case when the gas pressure is so controlled that the temperature variations in the cable and the sealed gas pressure variations are as indicated in FIG. 1. As is clear from the curve A, the phase temperature coefficient is less than $10^{-6}/°C$. over a wide range. The curve B in FIG. 2 represents the case in which the gas pressure is controlled such that, with a cable in which dry gas at 0.5 kg/cm² is sealed at a temperature of 0° C., the sealed gas pressure remains constant irrespective of temperature variations in the cable. This is similar to the case of gas leakage wherein the gas pressure in the cable is equal to the atmospheric pressure at all times. As is apparent from the curve B, the phase temperature coefficient abruptly increases as the temperature increases.

In accordance with a specific method for controlling the gas pressure in accordance with the invention, the temperature of an inner conductor or another convenient point of the coaxial cable is measured and the gas supply pressure is controlled utilizing the temperature thus measured so that the density of the gas sealed in the cable is at a predetermined value. With this method, the supply pressure is converted into electrical data by a sensor adapted to measure absolute pressures and a calculation is effected with the electrical data and data representing the temperature of the cable thus measured in accordance with which a gas supplying pressure-reducing valve is correctively operated in conformance with the relation indicated in FIG. 1 to thereby maintain the density of the gas sealed in the cable at a constant value.

As is apparent from the above description, in accordance with the method of the invention, the sealed gas pressure is controlled by taking into account gas pressure variations due to temperature variations. Therefore, the number of molecules of the sealed gas is maintained unchanged and, accordingly, the temperature coefficient of the electrical length of the cable is maintained at a very stable value.

Figure 3:
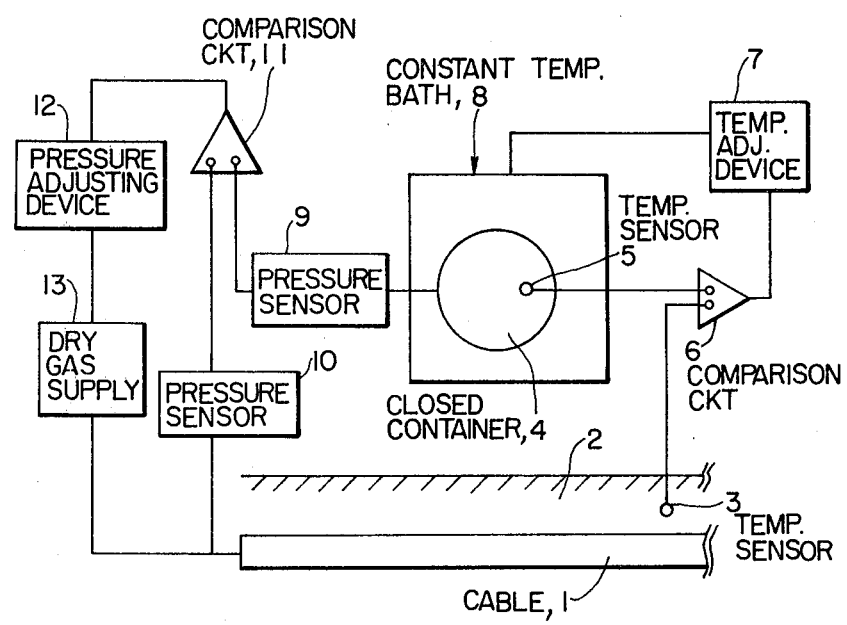
FIG. 3 is a schematic diagram showing an apparatus for controlling the pressure of gas sealed in the cable.

A preferred embodiment of an apparatus for practicing the method of the invention is shown in FIG. 3. With this apparatus, the pressure of gas sealed in a cable is controlled so that it is maintained equal to the pressure of a reference gas provided in a closed container. Preferably the same gas is used as in the cable. In FIG. 3, a cable 1 is buried in the ground 2. The temperature of the cable 1 is substantially equal to that of the ground 2. The output of a temperature measuring sensor 3 placed in the ground and the output of a temperature measuring sensor 5 in the closed container 4 are applied to respective inputs of a comparison circuit 6. The temperature of the closed container is controlled by changing the temperature of a constant temperature bath 8 which at least partially surrounds the closed container 4 with a temperature adjusting device 7 which operates in response to the output of comparison circuit 6 so as to maintain the outputs of the two sensors 3 and 5 at equal values. Accordingly, as long as no gas leakage occurs in the cable, the gases in the cable and the closed container will be equal in density and the density will remain substantially unchanged for a given temperature. If the material of which the closed container is fabricated is the same as that of the conductors of the cable, then the gases in the cable and the closed container will remain completely equal in density.

Should gas leakage occur from the cable, the output of a pressure sensor 9 which measures the pressure of gas in the closed container and the output of a pressure sensor 10 which measures the pressure of gas in the cable will not coincide with each other in a comparison circuit 11. In response to this condition, a pressure adjusting device 12 is operated in accordance with the output of comparison circuit 11 to cause a dry gas supplying device 13 to supply gas into the cable so that the two outputs are brought into coincidence with one other. As a result, variations in the gas density are minimized and, accordingly, the electrical length of the cable is maintained unchanged.

Particularly, in case the cable is installed underground, the temperature within the cable is maintained approximately unchanged. Accordingly, constant gas density in the cable is obtainable by comparing sealed gas pressure in the cable with reference gas pressure in the closed container, the gas temperature in the container being maintained unchanged.

What is claimed is:

1. A method for stabilizing the electrical length of a coaxial communication cable having a gas sealed in the electrically insulated space between the inner and outer conductors of the coaxial cable comprising: maintaining constant the density of said gas by controlling the pressure of said gas so as to satisfy the following equation in accordance with variations in the temperature of said coaxial cable:

$$P(T) = P(T_o) \cdot \left( 1 + \frac{T - T_o}{273 + (T - T_o)} \right),$$

wherein $T_o$ is a predetermined reference temperature, $P(T)$ is said pressure of said gas, T is said temperature, and $P(T_o)$ is the absolute pressure of said gas sealed in said coaxial cable at said reference temperature, thereby maintaining constant the dielectric constant of the sealed gas regardless of temperature changes and, thus, stabilizing the electrical length of the cable.

2. The method as claimed in claim 1 wherein said pressure of said gas sealed in said coaxial cable is controlled so as to be equal to the pressure of a reference gas sealed in a closed container whose temperature is maintained equal to the temperature of said coaxial cable.

3. The method as claimed in claim 2 wherein said closed container is disposed in a bath and further comprising the steps of producing electrical signals representing said temperature of said coaxial cable and said temperature of said gas in said closed container, comparing said electrical signals representing said temperatures, controlling said temperature of said bath in response to the result of said step of comparing said signals representing said temperatures to maintain said temperature of said coaxial cable and said temperature of said gas in said closed container equal to each other, producing electrical signals representing said pressure of said gas sealed in said closed container and said pressure of said gas sealed in said coaxial cable, comparing said signals representing said pressures, and controlling said pressure of said gas sealed in said coaxial cable in response to the result of said step of comparing said signals representing said pressure so that said pressures are maintained equal to each other.

4. A method for stabilizing the electrical length of a coaxial communication cable having gas sealed in the cable comprising the steps of: maintaining constant the density of the gas by maintaining the pressure of the gas sealed in said cable at a value equal to the pressure of reference gas sealed in a closed container and maintaining the temperature of said reference gas at a value equal to the temperature of said gas sealed in said cable, thereby maintaining constant the dielectric constant of the sealed gas regardless of temperature changes and, thus, stabilizing the electrical length of the cable.

5. The method as claimed in claim 4 wherein said step of maintaining said temperature of said reference gas comprises producing electrical signals representing said temperatures of said reference gas and said gas sealed in said cable, comparing said signals and controlling the temperature of a bath in which said closed container is at least partially disposed in accordance with the results of said comparing step wherein said bath is maintained at the same temperature as the temperature of said gas sealed in said cable.

6. The method as claimed in claim 4 or 5 wherein said step of maintaining said pressure comprises producing electrical signals representing said pressure of gas sealed in said cable and said pressure of reference gas sealed in said closed container, comparing said signals representing said pressures and controlling said pressure of gas sealed in said cable in accordance with the results of said step of comparing said signals representing said pressures so that said pressures are equal to each other.

* * * * *